United States Patent [19]

Zeitvogel

[11] Patent Number: 4,730,149
[45] Date of Patent: Mar. 8, 1988

[54] CIRCUIT ARRANGEMENT FOR REGULATING THE RPM OF A SERIES MOTOR

[75] Inventor: Heinrich Zeitvogel, Gaimersheim, Fed. Rep. of Germany

[73] Assignee: Telefunken electronic GmbH, Heilbronn, Fed. Rep. of Germany

[21] Appl. No.: 924,839

[22] PCT Filed: Dec. 21, 1985

[86] PCT No.: PCT/EP85/00737
§ 371 Date: Sep. 18, 1986
§ 102(e) Date: Sep. 18, 1986

[87] PCT Pub. No.: WO86/04468
PCT Pub. Date: Jul. 31, 1986

[30] Foreign Application Priority Data

Jan. 19, 1985 [DE] Fed. Rep. of Germany ....... 3501727

[51] Int. Cl.[4] .................. H02K 23/08; H02P 7/62
[52] U.S. Cl. ..................... 318/246; 318/331; 318/345 C; 318/345 AB; 318/345 G
[58] Field of Search ........... 318/244, 245, 246, 345 R, 318/345 C, 345 CB, 345 D, 345 G, 345 H, 248, 331, 334, 342, 345 A, 345 CA, 345 AB

[56] References Cited

U.S. PATENT DOCUMENTS

| | | | |
|---|---|---|---|
| 3,231,808 | 1/1966 | McDaniel | 318/331 |
| 3,705,337 | 12/1972 | Grabl | 318/345 C X |
| 3,868,554 | 2/1975 | Konrad | 318/345 C X |
| 4,259,623 | 3/1981 | Moeder et al. | 318/249 |
| 4,481,448 | 11/1984 | Bishop | 318/245 X |

FOREIGN PATENT DOCUMENTS

| | | | |
|---|---|---|---|
| 2608613 | 7/1977 | Fed. Rep. of Germany | 318/245 |
| 58-36185 | 3/1983 | Japan | 318/246 |

Primary Examiner—Bentsu Ro
Attorney, Agent, or Firm—Spencer & Frank

[57] ABSTRACT

A circuit arrangement for regulating the rpm of an electric motor having series connected field and armature windings 1, 4 comprises a controllable rectifier 5 which is connected in series with the motor and is controlled by a phase control unit 30 as a function of a control signal obtained at armature winding 1 and conducted via an operational amplifier 12. To achieve a very constant rpm and a high regulating speed with simple means, each terminal of armature winding 1 is connected to one input 10, 11 of a differential amplifier 12 whose output 15 is connected to one input 19 of a comparator. At its second input, the comparator is given a desired value signal which is changed in dependence upon the current flowing through armature 1.

9 Claims, 1 Drawing Figure

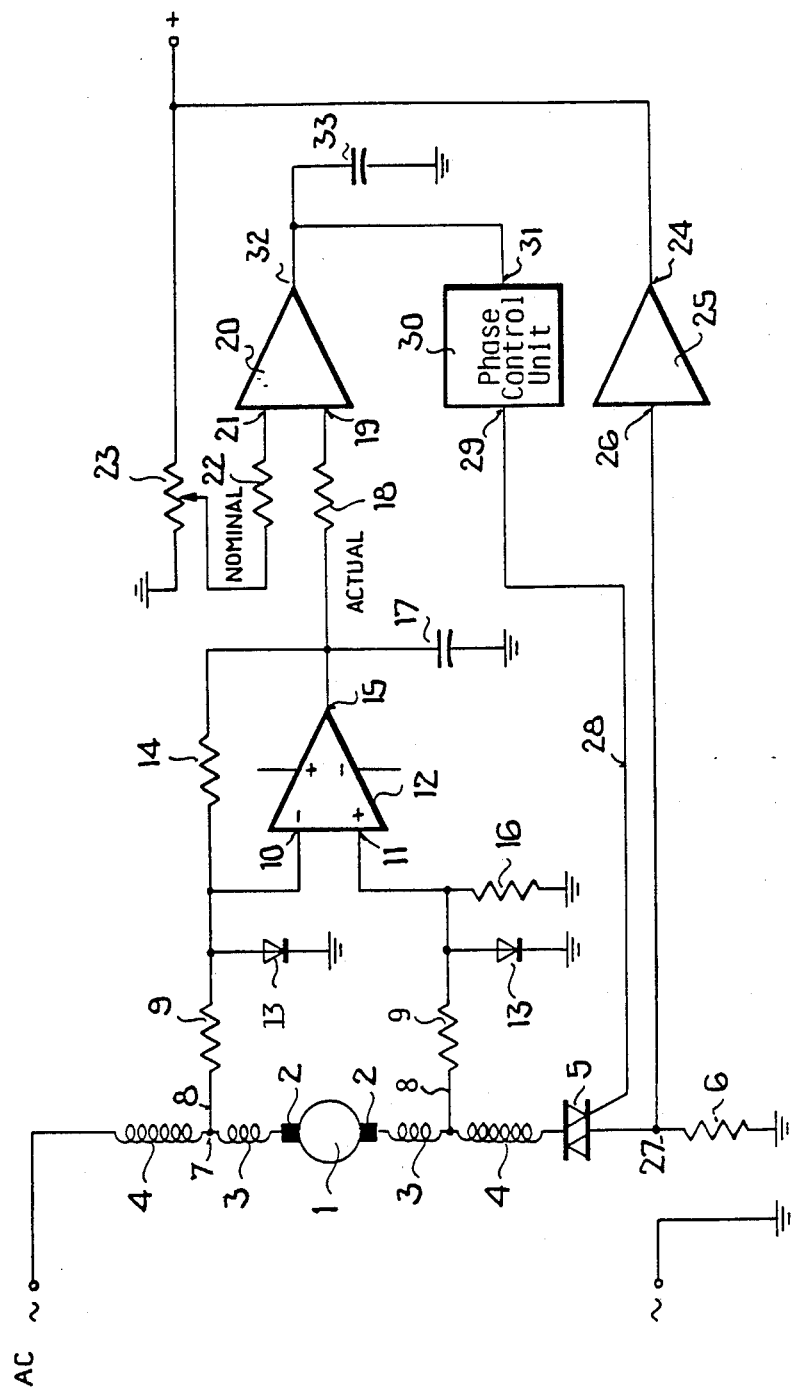

CIRCUIT ARRANGEMENT FOR REGULATING THE RPM OF A SERIES MOTOR

BACKGROUND OF THE INVENTION

The invention relates to a circuit arrangement controlling the speed of an electric motor.

In a known circuit of this type (DE-OS No. 2,906,388), the series connection of the armature winding of the electric motor and a controllable rectifier is connected between two field winding halves. Arranged in parallel with this series connection is a potentiometer whose pickup is connected to the inverting input of an operational amplifier configured as integrating amplifier. The inverting input of the operational amplifier is located at the terminal of the potentiometer connected directly to an electrode of the controllable rectifier. Arranged in parallel with the field winding portion starting at this reference potential point is a series connection of a capacitor and an ohmic resistor, with the capacitor being connected to the reference potential point. A line leads from the point of connection of the capacitor with the resistor to the inverting input of the operational amplifier. This generates a signal which is proportional to the motor current and is switched in opposition to the signal picked up at the potentiometer. The output of the operational amplifier controls a phase control unit which, in turn, charges the control electrode of the controllable rectifier. A drawback of this circuit arrangement is that the potentiometer for setting the rpm also picks up the voltage drop that builds up during the idle period of the controllable rectifier. To suppress this part of the control voltage present at the potentiometer pickup, since it falsifies the measuring result, a special switch is necessary which short-circuits the control signal at the potentiometer pickup with respect to the reference potential point during the idle time of the controllable rectifier.

SUMMARY OF THE INVENTION

The object underlying the invention is to provide a circuit arrangement of the above-described type which permits readjustment of the rpm in dependence upon the load by simple means.

This object is realized according to the invention by a circuit arrangement for controlling the rpm of an electric motor having series-connected field and armature windings to which a controllable rectifier is connected in series, the rectifier being controlled by a phase control unit as a function of a control signal obtained at the armature winding and conducted through an operational amplifier, wherein one terminal of the armature winding is connected to the inverting input of the operational amplifier, and the other terminal is connected to the non-inverting input of the operational amplifier so that the voltage between the inverting and non-inverting inputs of the operational amplifier is proportional to the voltage across the armature winding, the output of the operational amplifier is connected to one input of a comparator whose second input is connected to a desired value generator, and the output of the comparator is connected to the phase control input of the phase control unit.

In a circuit arrangement according to the invention, a voltage picked up directly at the armature terminals and proportionally changing with the rpm of the armature is passed to the two inputs of the operational amplifier following adaptation to the permissible control data of the operational amplifier. A control voltage corresponding to the armature rpm is then available at the output of the operational amplifier. This voltage is supplied as an actual value to an input of a comparator whose second input is provided with a desired value signal. If the actual value supplied by the operational amplifier is lower than the given desired value, the comparator supplies to the phase control input of the phase control unit a signal which changes the phase control angle via the controllable rectifier so that the change in current flow causes the actual value to be brought close to the desired value. Since the comparator only emits an on or off signal, rapid readjustment of the rpm is achieved. However, to prevent overshooting during the control process, an integration capacitor is connected to the output of the comparator.

To improve the control characteristics even further, a measuring resistor is connected in series with the motor circuit, with a measuring voltage proportional to the motor current actually flowing being picked up at the resistor. To enable the resistance value to be kept low, the measuring voltage is connected to the input of an amplifier whose output signal feeds a desired value potentiometer. The pickup of this desired value potentiometer is connected to the respective input of the comparator. The desired value is thus controlled as a function of the motor current so that in the event of a load on the motor, not only the control voltage picked up at the armature winding, but also the measuring voltage picked up at the measuring resistor lead to an increase in the current conduction angle through the controllable rectifier.

The invention will be described in greater detail below with reference to a circuit diagram of an embodiment.

BRIEF DESCRIPTION OF THE DRAWING

The sole FIGURE is a circuit diagram of a preferred embodiment of the invention.

DESCRIPTION OF THE PREFERRED EMBODIMENTS

An electric series motor having an armature 1 and an armature winding mounted thereon is contacted via carbon brushes 2 and a collector. An inductor 3 is connected to each carbon brush so as to suppress radio interference voltages, with one partial winding 4 of the field coil being connected in series with each inductor. While the one partial winding 4 is directly connected to the mains voltage, the other partial winding is connected to ground via the series connection of a controllable rectifier 5 and a measuring resistor 6, with the second pole of the mains voltage also being grounded. Connected to each of the points of connection of the inductors 3 with partial windings 4 is a connecting line 8 which is connected via protective resistors 9, on the one hand, to the inverting input 10 and, on the other hand, to the non-inverting input 11 of an operational amplifier 12. Protective diodes 13 whose cathodes are grounded are also connected to these inputs. The inverting input 10 is connected via a feedback resistor 14 to output 15 of operational amplifier 12, while the non-inverting input 11 is grounded via a resistor 16. Protective resistor 9 are dimensioned so that the voltage picked up across the armature winding at connecting lines 8 does not exceed the permissible values at inputs 10, 11, and, in conjunction with resistors 14, 16, serve to set the gain. A capacitor 17 grounded at one end is also connected in parallel with output 15, so as to filter out sudden interference voltages occurring due to faults, particularly fire at the carbon brushes. Output 15 of operational amplifier 12 is connected via an intermediately connected limiting resistor 18 to an input 19 of a comparator 20 to whose second input 21 the pickup of a potentiometer 23 is connected via a limiting resistor 22. One terminal of potentiometer 23 is grounded and its second terminal is connected to output 24 of an adaptive amplifier 25 whose input 26 is connected to the point of connection between controllable rectifier 5 and measuring resistor 6. Controllable rectifier 5 is configured as a triac. Its control electrode 28 is connected to the output 29 of a phase control unit 30 whose input 31 is connected to output 32 of comparator 20. An integration capacitor 33 is connected in parallel with output 32 of comparator 20.

Following connection of series motor 1, 4 to an AC mains, armature 1 develops an rpm which corresponds to the desired value given at desired value potentiometer 23. Assuming that the armature is not under load, then the phase angle given by phase control unit 30 for the AC half waves based on the preceding zero passage is relatively large. Therefore, only the part of the half wave missing from 180° is utilized for a current passage. If a mechanical load or braking effect then occurs at armature 1, the armature voltage present at connecting lines 8 drops according to the reduction in rpm. Since operational amplifier 12 is configured as a differential amplifier, the decreasing voltage difference between the connecting lines 8 causes a corresponding drop in the signal voltage at output 15 of operational amplifier 12. Since in the previous no-load case, the voltages at inputs 19, 21 of the comparator were of identical height, the actual signal voltage at input 19 now falls short of the desired value set at desired value potentiometer 23. The result of this is that the comparator output is switched to maximum output voltage, which in turn conducts at its output 29 a control pulse which is shifted towards the zero point to control electrode 28 of triac 5 via phase control input 31 of phase control unit 30. The current conduction angle increased thereby generates a higher mean value for the current through field windings 4 and armature 1. This causes a rise in the armature rpm and thus in the voltage across the armature winding until the voltage difference at connection lines 8 assumes a value which is equal to or greater than the desired value given by desired value potentiometer 23. The measured voltage rising correspondingly with the increased current conduction angle at measuring resistor 6 causes simultaneously a correspondingly increased supply voltage for desired value potentiometer 23 at output 24 of amplifier 25 so that the desired value is raised. However, this rise is so slight that this positive feedback does not produce overshooting which would lead to an actual excessive rpm of armature 1. If the actual value signal then reaches the value of the desired value signal, the comparator switches over its output signal again, with the result that phase control unit 30 moves the phase control angle back towards 180°. To avoid abrupt changes, an integration capacitor 33 is connected to output 32 and prevents at least a sudden change in the phase control angle from low to high values.

In the event of a reduction in the mechanical load of armature 1, an increase in rpm and thus a corresponding increase in the differential voltage occur at connecting lines 8. This change in the differential voltage across armature 1 causes an appropriate readjustment of the actual voltage value at input 19 of the comparator which thus switches its output signal back towards "zero", as a result of which the current conduction angle is reduced by phase control unit 30. If the mean current flow through motor 1, 4 is lower, the rpm of armature 1 also drops until the balance at inputs 19, 21 of the comparator has been restored and the phase control angle increases again if the rpm continues to drop. The phase control angle is thus re-adjusted for each half wave of the alternating current as a function of the rpm of armature 1 and is controlled via traic 5. The result is a very constant rpm.

I claim:

1. A circuit arrangement for controlling the rpm of an electric motor having series-connected field and armature windings to which a controllable rectifier is connected in series, said rectifier being controlled by a phase control unit as a function of a control signal obtained at the armature winding and conducted through an operational amplifier, characterized in that one terminal (2, 7) of the armature winding (1) is connected to the inverting input (10) of the operational amplifier (12), and the other terminal (2, 7) is connected to the non-inverting input (11) of said operational amplifier so that the voltage between the inverting and non-inverting inputs of said operational amplifier is proportional to the voltage across the armature winding, the output (15) of the operational amplifier (12) is connected to one input (19) of a comparator (20) whose second input (21) is connected to a desired value generator (23), and the output (32) of the comparator (20) is connected to the phase control input (31) of the phase control unit (30).

2. A circuit arrangement according to claim 1, characterized in that protective resistors (9) are placed in the connecting lines (8) from the terminals (7) of the armature winding (1) to the inputs (10, 11) of the operational amplifier (12).

3. A circuit arrangement according to claim 1, characterized in that a protective diode (13) is connected in parallel with each input (10, 11) of the operational amplifier (12).

4. A circuit arrangement according to claim 1, characterized in that the output (15) of the operational amplifier (12) is connected via a feedback resistor (14) to its inverting input (10).

5. A circuit arrangement according to claim 1, characterized in that a capacitor (17) is connected in parallel with the output (15) of the operational amplifier (12).

6. A circuit arrangement according to claim 1, characterized in that the field winding has two parts, at each terminal (2) a respective inductor (3) is connected in series between the armature winding (1) and a respective field winding part and the inputs (10, 11) of the operational amplifier (12) are each connected to the point of connection between said respective inductor (3) and said respective field winding part.

7. A circuit arrangement according to claim 1, characterized in that the desired value generator is a potentiometer (23) whose pickup is connected to the second input (21) of the comparator (2) and the potentiometer is fed a voltage that is dependent on the motor current.

8. A circuit arrangement according to claim 1, characterized in that a resistor (6) is connected in the circuit of the motor and a control voltage proportional to the measuring voltage dropping across said resistor (6) is fed to the desired value generator (23).

9. A circuit arrangement according to claim 8, characterized in that the measuring voltage is fed as a control signal to an amplifier (25) and the output (24) of the amplifier is connected to the potentiometer (23).

* * * * *